United States Patent [19]

Jenes

[11] Patent Number: 4,873,825
[45] Date of Patent: Oct. 17, 1989

[54] POSITIVE DISPLACEMENT ENGINE COMPOUNDED WITH A GAS TURBINE ENGINE

[76] Inventor: John A. Jenes, 7 Hollies Close, Newton Solney, Burton-on-Trent, Staffordshire, DE15 OSB, England

[21] Appl. No.: 101,300

[22] PCT Filed: Jan. 16, 1987

[86] PCT No.: PCT/GB87/00024
§ 371 Date: Sep. 15, 1987
§ 102(e) Date: Sep. 15, 1987

[87] PCT Pub. No.: WO87/04492
PCT Pub. Date: Jul. 30, 1987

[30] Foreign Application Priority Data

Jan. 16, 1986 [GB] United Kingdom ............... 86 01065

[51] Int. Cl.⁴ ..................... F02B 37/00; F02B 41/10
[52] U.S. Cl. ..................................... 60/606; 123/316
[58] Field of Search ................... 60/605, 606, 611; 123/316, 559.1

[56] References Cited

U.S. PATENT DOCUMENTS

| | | | |
|---|---|---|---|
| 2,468,157 | 4/1949 | Barlow et al. | 60/606 X |
| 2,583,651 | 1/1952 | Horning | 60/606 X |
| 2,780,912 | 2/1957 | Miller | 60/611 |
| 2,991,616 | 7/1961 | Miller | 60/611 X |
| 3,093,959 | 6/1963 | Birmann | 60/605 |
| 3,498,053 | 3/1970 | Johnston | 60/606 X |
| 4,215,549 | 8/1980 | Daeschner | 60/606 |
| 4,449,370 | 5/1984 | Ream | 60/606 |

FOREIGN PATENT DOCUMENTS

| | | | |
|---|---|---|---|
| 581784 | 11/1976 | Switzerland | |
| 992769 | 1/1983 | U.S.S.R. | |
| 633723 | 12/1949 | United Kingdom | 60/606 |

OTHER PUBLICATIONS

"Some Unusual Engines", L. J. K. Setright, Mechanical Engineering Publications Ltd. for the Institution of Mechanical Engineers, London, 1975.
AIAA-83-1338, "Compound Cycle Turbofan Engine", J. G. Castor, Jun. 27-29, 1983.
NASA Technical Memorandum 88879, USAAV-SCOM Technical Report 86-C-37, "Compound Cycle Engine Program", Bobula et al, 1986.
SAE Paper No. 740723, "Hyperbar System of High Supercharging", Melchior et al, 1974.

Primary Examiner—Michael Koczo
Attorney, Agent, or Firm—Cushman, Darby & Cushman

[57] ABSTRACT

A prime mover comprises a positive displacement engine (100), such as a reciprocating or rotary piston engine, which is linked to a turbine/turbocompressor set, such as the gas turbine engine (102). The exhaust gases of the positive displacement engine pass through a duct (122) to drive the turbine (134) which drives the turbocompressor (106), which in turn turbocharges the positive displacement engine (100) through a duct (108). Disclosed are efficient overall operating cycles for such prime movers, advantageous adaptations of prime movers capable of performing such operating cycles, and operating cycles for the positive displacement engine (100) which enable it to contribute most effectively to the efficiency of the overall operating cycles.

10 Claims, 7 Drawing Sheets

POSITIVE DISPLACEMENT ENGINE COMPOUNDED WITH A GAS TURBINE ENGINE

This invention relates to prime movers comprising a positive displacement engine compounded with a turbine/turbocompressor set, designated herein, with reference to the former component, as turbocompounded positive displacement engines. The invention further relates to operating cycles for such engines.

In general terms, it is already well known to link a turbine/turbocompressor set to a positive displacement engine, such as a reciprocating piston or rotary piston engine, so that the exhaust gases of the latter drive, or help to drive, the turbine, which drives the turbocompressor, which in turn turbocharges the positive displacement engine. Compound engine arrangements are also known in which the turbine/turbocompressor set, through exchanging air for combustion gases from the positive displacement engine, is actually part of a gas turbine engine capable of operating independently of the positive displacement engine. The present specification deals with improvements in both these types of prime movers.

It has been long considered desirable to turbocharge positive displacement engines, or to compound a positive displacement engine with a gas turbine engine, in order to maximise power output and fuel efficiency while minimising specific weight. Examples of turbocompounded piston engines are too numerous to mention, and many are very well known, particularly in the field of automotive technology.

A good early example of this type of engine as applied to aircraft propulsion was the "Napier Nomad", described for example, in the magazine "Flight", vol. 65, no. 4, April 1954, pp. 543–551. It consisted of a turbocharged 12-cylinder, 2-stroke diesel with the turbine/turbocompressor set driven off the diesel's exhaust, the two parts of the engine being interconnected through a variable gear which allowed the two shaft speeds to be optimally matched over the flight regime of the aircraft in which it was installed. It was not commercially successful, because it was heavier and more complex than equivalent turbojets; also turbojets offered higher speeds, while fuel at the time was relatively cheap so that the higher fuel consumption of the turbojet was not very much of a penalty.

Since then, numerous other studies on turbo-compounded positive displacement engines for aircraft propulsion have been carried out as technology has advanced. For example, NASA Technical Memorandum TMX-71906 entitled "Preliminary Evaluation of a Turbine/Rotary Combustion Compound Engine for a Subsonic Transport" by K. C. Civinskas et al, March 1976, shows what is essentially a high pressure ratio turbofan which has had its combustor replaced by a rotary piston engine, the compressor and turbine being on the same main shaft as the rotary piston engine and the fan also being geared to that shaft. The rotors of the rotary piston engine orbit directly about the main shaft. In terms of aeroengines this was not considered a successful design at the time, the improved fuel consumption obtained being insufficient to compensate for increased engine weight as compared with the reference turbofan.

More recently, U.S. Pat. No. 4,449,370 discloses a compound engine for aircraft use in which a low compression turbocharged diesel engine has a turbocharger which can be operated independently of the diesel. This is possible because although the turbine receives the exhaust gases from the diesel, they first pass through a catalytic combustor inserted in the cycle before the turbine, so that whenever needed, fuel and air can be supplied to the catalytic combustor to provide additional heating of the exhaust gases; furthermore, a valve and ducting is provided so that the diesel engine can be selectively bypassed, the compressor (blower) air being passed straight to the catalytic combustion chamber to drive the turbine and hence provide power for auxiliary equipment during the starting sequence.

A survey of these and numerous other proposed examples of turbocompounded positive displacement engines seems to reveal that, though of varied type and construction, they follow convention for such engines in that the pressure at which the turbocharging air is delivered to the positive displacement engine is lower than the pressure at which the combustion gases from the positive displacement engine are exhausted to the turbine.

Furthermore, considering examples of both 2-stroke and 4-stroke operating cycles of positive displacement engines in the ordinary case where they are not turbocompounded, it can be observed that, as a general rule, their compression ratios are approximately the same as their expansion ratios. It appears to be a fact that this general rule for positive displacement engines has also been applied to them when they have been compounded with turbine/turbocompressor sets. An exception to this appears to be the so-called "more complete expansion cycle", which is known to designers of turbocharged and supercharged 4-stroke reciprocating engines.

It is here contended that the facts mentioned in the above two paragraphs are disadvantageous because, for reasons which will be appreciated later, they result in the overall operating cycles of turbocompounded positive displacement engines being less efficient and powerful than they could be.

It is an object of the present invention to provide efficient overall operating cycles capable of developing greater powers for prime movers comprising a positive displacement engine compounded with a turbine/turbocompressor set. An allied object of the invention is to provide such prime movers capable of performing the said operating cycles.

A further object of the invention is to provide turbocompounded positive displacement engines with operating cycles which enable them to contribute most effectively to the efficiency of the said overall operating cycles of the prime movers.

Accordingly, the present invention provides an operating cycle for a prime mover—the prime mover comprising a positive displacement engine compounded with a turbine/turbocompressor set—in which the compression ratio of the positive displacement engine is substantially less than its expansion ratio, turbocharging air from the turbocompressor is delivered to the positive displacement engine at a first, higher pressure, and the combustion gases from the positive displacement engine are exhausted to the turbine at a second, lower, pressure. Good scavenging of spent combustion products from the positive displacement engine is thereby assured; at the same time a good match is obtained between the compression and expansion characteristics of the turbine/turbocompressor set and the positive displacement engine.

In one embodiment of the invention the operating cycle for the prime mover includes an operating cycle of the 4-stroke type for the positive displacement engine, said operating cycle of the 4-stroke type being of the variety known as a more complete expansion cycle.

In other embodiments of the invention, the operating cycle for the prime mover includes an operating cycle of the 2- or 4-stroke type for the positive displacement engine, said operating cycle for the positive displacement engine being other than the 4-stroke type known as a more complete expansion cycle, the compression ratio of the positive displacement engine being approximately half its expansion ratio: preferably, the compression ratio is half the expansion ratio, plus 0.1.

By the term "an operating cycle of the 2-stroke type" is meant either a 2-stroke cycle as ordinarily performed by an appropriate type of reciprocating piston engine, or the equivalent of a 2-stroke cycle as performed by other types of positive displacement engine in terms of the indicator diagrams they produce. By the term "an operating cycle of the 4-stroke type" is meant either a 4 stroke cycle as ordinarily performed by an appropriate type of reciprocating piston engine, or the equivalent of a 4-stroke cycle as performed by other types of positive displacement engine in terms of the indicator diagrams they produce.

The value of the expansion ratio of the positive displacement engine may be in the range 3 to 12 inclusive. For operation at sea level and normal land altitudes, the expansion ratio is preferably in the range 3 to 8 inclusive, while for operation at high altitudes a range of 6 to 12 inclusive is preferred. The turbine/turbocompressor set is provided with pressure ratios concomitant with these expansion ratios of the positive displacement engine.

In another aspect, the invention provides a prime mover comprising a positive displacement engine, a turbine/turbocompressor set, turbocharging air delivery means for delivering turbocharging air from the turbocompressor to the positive displacement engine and combustion gas exhaust means exhausting combustion gases from the positive displacement engine to the turbine for driving the turbocompressor, the positive displacement engine being adapted to operate with a compression ratio which is substantially less than its expansion ratio, the turbocharging air delivery means delivering the turbocharging air at first higher pressure and the combustion gas exhaust means exhausting the combustion gases at a second, lower, pressure.

The positive displacement engine component of the prime mover is preferably adapted to perform one of the operating cycles of the 2- or 4-stroke types previously mentioned.

In order to ensure that the above-mentioned first pressure is substantially higher than the above-mentioned second pressure it may be preferable to include scavenge pump means, such as a low pressure ratio supercharger, in the turbocharging air delivery means.

For high-power prime movers in particular, the turbine/turbocompressor set may advantageously be part of a gas turbine engine having combustion chamber means in flow series between the turbocompressor and the turbine and further having a free power turbine in flow series after the turbine, the combustion gas exhaust means being connected between the positive displacement engine and the combustion chamber means, whereby the combustion gases from the positive displacement engine are exhausted to the turbine through the combustion chamber means. Such a compound engine preferably includes a combustion gas distribution duct which surrounds the combustion chamber means and is adapted to distribute the combustion gases substantially evenly around the combustion chamber means. Preferably, the turbocharging air delivery means includes valve means for selectively preventing delivery of turbocharging air to the positive displacement engine, whereby the gas turbine engine can be operated whilst the positive displacement engine is shut down.

Semi-adiabatic operation of the positive displacement engine is an advantageous objective, and to facilitate this the turbocharging air delivery means is preferably adapted to deliver a portion of the turbocharging air to a cooling system of the positive displacement engine, the prime mover being further provided with air exhaust means for exhausting said portion of the turbocharging air to the turbine after use in the cooling system. In the case of a compound engine as mentioned above the air exhaust means is preferably connected between the positive displacement engine and the combustion chamber means, whereby said portion of the turbocharging air is exhausted to the turbine through the combustion chamber means after use in the cooling system: it is preferred that the air exhaust means includes an air distribution duct which surrounds the combustion chamber means and is adapted to distribute the air substantially evenly around the interior of combustion chamber means.

The inventive concepts outlined in the above paragraphs require turbocompounded positive displacement engines to be designed with operating cycles of either the 2-stroke type or the 4-stroke type which enable them to contribute most effectively to the overall efficiency of the prime mover.

Accordingly, a major aspect of the invention is the provision of an operating cycle of the two-stroke type for a turbocompounded positive displacement engine, in which the positive displacement engine is turbocharged with turbocharging air during an early section of the compression part of the cycle and the turbocharging air is compressed during a last section of the compression part of the cycle, scavenging of combustion gases from the positive displacement engine being aided by purging with turbocharging air during at least an initial portion of said early section of said compression part of the cycle. Assuming optimisation of this cycle for a reciprocating piston engine, it is preferred that the compression stroke comprises a first, early, section during which the cylinder is turbocharged with turbocharging air, and a second, last section during which the turbocharging air is compressed, the first section having an initial portion during which turbocharging air is allowed to flow through the cylinder to accomplish said purging. Assuming optimization for a rotary piston engine, it is preferred that the compression part of the cycle comprises a first, early, section during which combustion products are exhausted without assistance from turbocharging air, a second, early, section during which the rotary combustion chamber is turbocharged with turbocharging air, and a third, last, section during which the turbocharging air is compressed, the second section having an initial portion during which turbocharging air is allowed to flow through the rotary combustion chamber to accomplish said purging.

A further major aspect of the invention is the provision of an operating cycle of the 4-stroke type for a turbocompounded positive displacement engine in which the positive displacement engine is turbocharged with turbocharging air during the induction part of the cycle, scavenging of combustion gases from the positive displacement engine being aided by purging with turbocharging air during an initial portion of the induction part of the cycle. Preferably, said purging with turbocharging air also occurs during a final portion of the expansion part of the cycle. Assuming optimisation of this cycle for a reciprocating piston engine employing a more complete expansion cycle, it is preferred that the induction stroke comprises a first section during which the cylinder is turbocharged with turbocharging air, and a second section during which the turbocharging air is expanded, the first section having an initial portion during which turbocharging air is allowed to flow through the cylinder to accomplish said purging.

It should be understood that the turbines and the turbocompressors mentioned above may be either of the radial flow type or of the axial flow type, according to which type can be made to perform their part of the overall operating cycle of the prime mover most efficiently.

A leading advantage of the concepts outlined above is that they provide a means of greatly increasing the air flow through a given size of positive displacement engine—and hence the power produced—without necessarily generating high peak combustion pressures in the positive displacement engine. Furthermore, the air charge will be cleaner before combustion occurs than in prior such engines. The concepts are very suitable for use where the positive displacement engine is a diesel engine, but could also be applied to both spark ignition engines and those fueled by gas.

Compared to equivalent reciprocating engines, prime movers according to the invention could offer a major reduction in the number of cylinders required and therefore in the weight and volume of the power unit, coupled with a significant reduction in fuel consumption. Compared to equivalent gas turbine engines, fuel consumption could be reduced and lower cost fuels used.

Embodiments of the invention will now be described, by way of example only, with reference to the accompanying drawings, in which.

Figure 1:
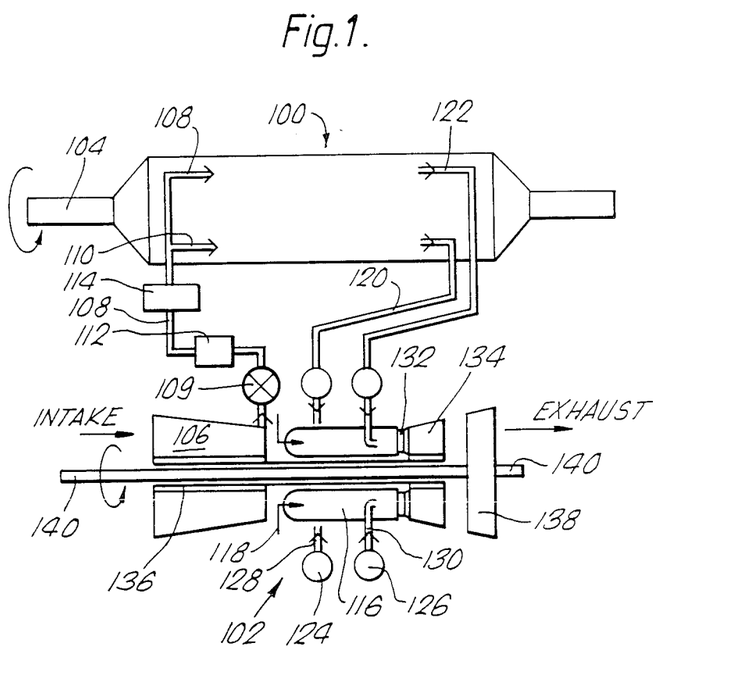
FIG. 1 is a schematic arrangement of a compound engine comprising a gas turbine engine compounded with a diesel engine.

Referring now to FIG. 1, there is shown, in schematic form, a compound engine comprising a multi-cylinder diesel engine 100 compounded with an atmospherically aspirated, twin spool, axial flow gas turbine engine 102 which is shown partly in axial cross-section. Both the diesel engine 100 and the gas turbine engine 102 may be derived from known types, but modified to the extent necessary to work the invention. For some purposes, it is preferable that the diesel engine 100 has a 2-stroke operating cycle and this will be assumed unless otherwise stated. As is normal, the pistons (not shown) are connected to a crankshaft (not shown) which drives a low speed output shaft 104. As will be explained later, the two engines are compounded together in such a way that their individual thermodynamic cycles are efficiently matched.

It will be seen from FIG. 1 that the diesel engine 100 is aspirated by turbocharging it from the output of the turbocompressor 106 of the gas turbine engine 102 through a turbocharger air duct 108. This air duct 108 incorporates an air valve 109 by means of which the air duct can be partially or completely obturated when required, as explained later, so as to reduce or prevent aspiration of the diesel engine 100.

In fact, the turbocharging air in air duct 108 is split two ways, one way being through a branch duct 110 for use as cooling air for cooling the cylinder head, cylinder liner and other components of the diesel engine 100, and the other way being through a continuation of duct 108 to aspirate the cylinders.

In order to adjust the temperature of the turbocharging air to an optimal value for making the diesel engine semi-adiabatic, it is probably necessary to incorporate a heat exchanger 112 in duct 108. If cooling of the turbocharging air is required, the fluid with which the air exchanges heat could be the fuel supply to the gas turbine engine 102 and/or the diesel engine 100, or heat could be rejected to the atmosphere through a fan-assisted radiator. If warming of the turbocharging air is required, the heat exchange fluid could be exhaust air from the cooling system(s) of the diesel engine 100 and/or the gas turbine engine 102.

A beneficial effect of using turbocharging air to cool the cylinder components is that the extraction of heat (up to 30% of total heat liberated) means that less fuel is required in the gas turbine engine's combustion chamber. The gas turbine engine can therefore generate power at a significantly improved fuel consumption, which could be similar to that of the diesel. The fuel consumption of the combined unit is thereby improved.

In addition to the heat exchanger 112, the turbocharging air supply duct 108 preferably includes a scavenge pump 114 in the form of a low pressure-ratio supercharger of known type which can be driven from the electrical system (not shown) of the compound engine, or preferably by a mechanical power offtake (not shown) from the diesel engine 100 or the gas turbine engine 102. The scavenge pump 114 may well be necessary in order to promote turbocharging air flow into and through the diesel engine 100 since the pressure difference between the outlet of the turbocompressor 106 and the exhaust outlet of the diesel engine may otherwise be insufficient to cause adequate circulation of the air through the cylinders and the cooling system.

Instead of being used for turbocharging, some (or if valve 109 is closed, all) of the air from the turbocompressor 106 is delivered directly to an annular combustion chamber 116 of the gas turbine engine 102, fuel being injected into the combustion chamber in known way by fuel injector nozzle 118 for burning with the turbocompressor delivery air. With air valve 109 partly or completely open, combustion occurs not only with the air from turbocompressor 106, but also with exhaust cooling air from the diesel's cooling system and with exhaust combustion gases from the diesel's exhaust parts.

Although air valve 109 is thought to be a necessary component of the compound engine for most purposes for which such an engine would be used, it would of course be preferably to do without it if possible for the sake of simplicity. This would depend upon the practicalities of the design in each case; for example, whether the diesel and gas turbine engines and their accessories were of such a design that both engines could be started simultaneously.

During design of the compound engine, it should also be considered whether the air valve 109, if present, should be progressive in its opening and closing action, as specified above, or alternatively be a simple two-position open/close valve. This choice will depend upon whether throttling of the turbocharging air supply to the diesel engine 100 is desirable during any part of its operating range.

Having exited the diesel engine 100 the exhaust cooling air and the exhaust combustion gases are conveyed to the gas turbine engine 102 by means of respective exhaust ducts 120 and 122. To ensure even distribution of both types of diesel exhaust around the annular combustion chamber 116, the exhaust ducts 120 and 122 discharge into respective annular distribution ducts 124,126 which surround the combustion chamber. From distribution duct 124, the diesel exhaust cooling air is passed through a number of equi-angularly spaced-apart distribution ports 128 to the region immediately surrounding the upstream end of the combustion chamber 116 so that it can gradually pass into the combustion chamber through air dilution holes (not shown) in the chamber wall, as known, to take part in the combustion process at a slightly later stage than the air coming direct from the outlet of the compressor 106. The diesel exhaust combustion gases in distribution duct 126, however, are passed through distribution ports 130 direct to a downstream interior region of the combustion chamber 116 so as to join the combustion process at a still later stage.

After passing through nozzle guide vane ring 132, the combustion gases exiting the gas turbine engine combustor 116 are expanded through a high pressure turbine 134, which extracts sufficient energy from the combustion gases to drive the turbocompressor 106, this being mounted on the same drive shaft 136 as the high pressure turbine. Finally, the gases are expanded through a free power turbine 138 to atmosphere. This is mounted on an output shaft 140 which runs inside shaft 136 and takes the output power to the forward end of the gas turbine engine 102.

Taking an overall view of the compound engine shown in FIG. 1, the power outputs comprise a low speed output shaft 104 from the diesel engine 100, and a high speed output shaft 140 from the gas turbine engine 102. Mechanical, fluid or electrical coupling together of the two shafts may or may not be desirable, depending upon the power developed by the engines and the uses to which the power may be put. Such mechanical, fluid or electrical coupling is of course known in the art and so will not be described here in detail.

For example, in high power aeroengine applications, the powers developed may be too great for easy handling by gears or fluid couplings, so that it may be advantageous to use the output shaft 104 to drive a large relatively slow turning propeller or ducted fan, while using the output shaft 140 to drive a smaller relatively fast turning propeller or ducted fan. In contrast, for a helicopter engine arrangement, the two output shafts 104,140 could be geared together to drive the main rotor through a modified form of helicopter reduction gear.

Starting of the two engines 100,102 relies on known technology. Thus, the gas turbine engine 102 could be started using a known type of electrical or air starter. If the diesel engine shaft 104 is not coupled to the gas turbine engine shaft 140, it would be necessary to utilise a conventional form of electrical or air starter motor for starting the diesel engine 100.

A suggested starting and operational sequence for the compound engine of FIG. 1 is as follows:

(a) The gas turbine engine 102 is started first and is run up to a suitable idling speed as an independent unit, the air valve 109 being closed, so that there is no air feed to the diesel engine 100.

(b) When the gas turbine engine 102 is self-sustaining and is developing some power, the diesel engine 100 is then started, using either a separate starter motor attached to shaft 104, or by driving it through a coupling between shafts 104 and 140. The air valve 109 is opened, scavenge pump 114 is started, and fuel is admitted to the diesel engine.

(c) As the diesel engine 100 accelerates into its normal running range, both the gas turbine engine 102 and the diesel engine continue running as separately fueled units while cooperating synergistically as a compound engine, the gas turbine engine turbocharging the diesel engine and the diesel engine exhaust contributing to the power being developed by the gas turbine engine.

(d) During operation the amounts of power developed by each engine can be varied relative to each other to give optimum performance or efficiency. Since the supercharged diesel engine will be more fuel efficient than the gas turbine engine, it will, if possible, be advantageous to arrange that for periods when the total power output required from the compound engine is steady at moderate or low levels, most of the power is supplied by the diesel engine component, the gas turbine engine being throttled back or extinguished: in the latter case, it would function as a turbocharger but with some power produced by the power turbine. However, higher power levels could easily be supplied by arranging for the gas turbine engine to operate lit at a higher power level and thus supply a greater proportion of the total power of the compound engine.

It should be noted that the gas turbine engine 102 is preferably designed to operate at a high pressure ratio. Hence operation of the compound engine with the gas turbine engine lit, rather than operating unlit as a turbocharger, would not involve excessive fuel consumption.

The arrangement shown in FIG. 1 is capable of as much variation in design as other forms of turbocompounded unit and features such as further heat exchangers, re-generation and bottoming cycles could be included.

Figure 2:
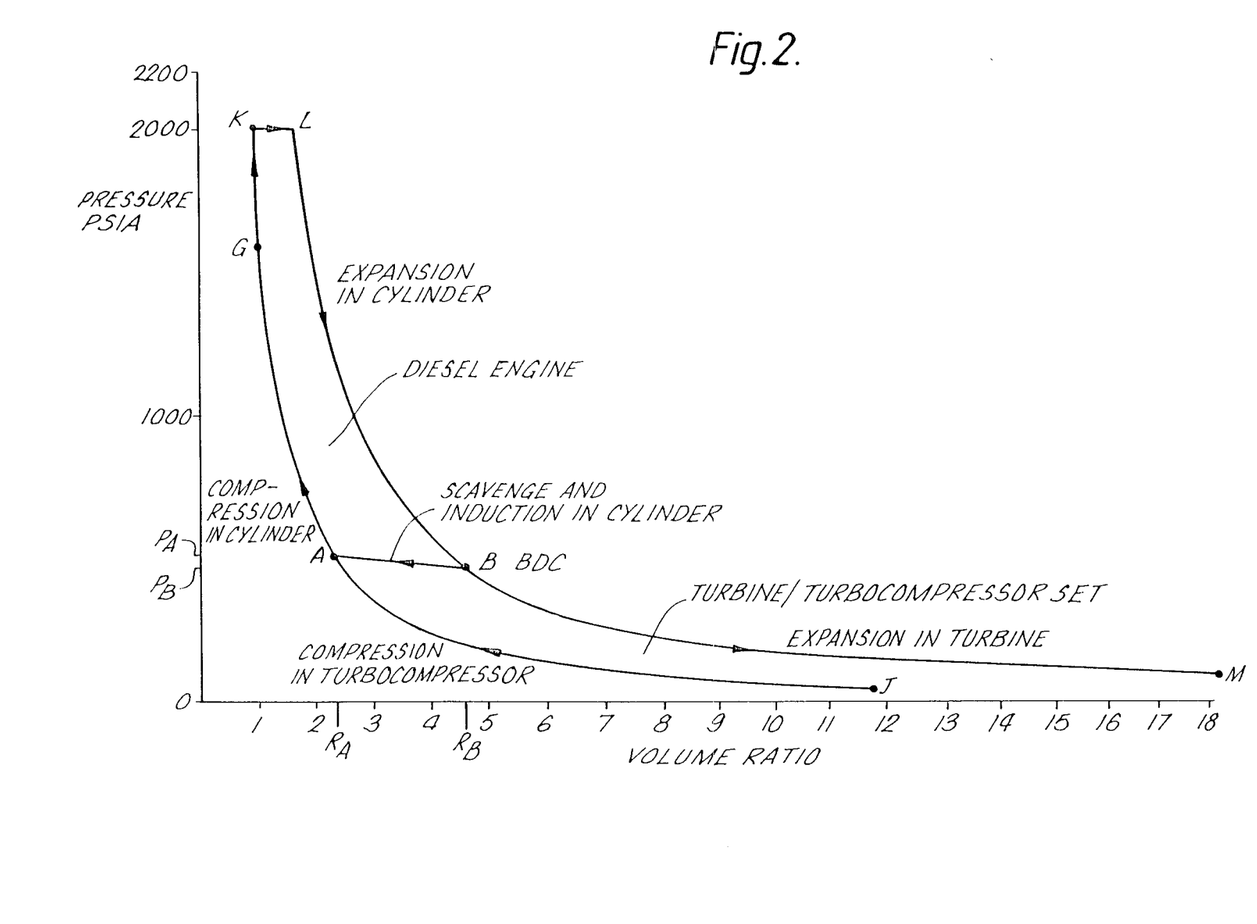
FIG. 2 is an idealised indicator diagram illustrative of the overall operating cycle of the compound engine of FIG. 1, assuming a 2-stroke operating cycle for the diesel engine.

Referring now to FIG. 2, there is shown an idealised indicator diagram expressive of the overall operating cycle of the preferred form of compound engine discussed in relation to FIG. 1, in which air and combustion gas pressures in pounds per square inch absolute are plotted as the ordinate against the corresponding volume ratios of the diesel engine and the gas turbine engine at various stages in the cycle.

The overall cycle may be described as follows:

(i) Air at atmospheric pressure enters the turbocompressor 106 (FIG. 1) at point J and is delivered as turbocharging air to the cylinders of the diesel engine 100 at point A with a turbocharging pressure $P_A$. Point A is a point during the first or compression stroke of the preferred 2-stroke cycle, after bottom dead centre.

(ii) Between points A and G the charge of air in the cylinder of the diesel engine is compressed as the piston travels up the cylinder towards top dead centre.

(iii) Combustion occurs at approximately constant volume between points G and K, and at approximately constant pressure between K and L.

(iv) From L to B expansion occurs in the cylinder as the piston travels back down the cylinder towards bottom dead centre at B, whereupon the combustion gases from the diesel are exhausted at a pressure $P_B$ to the turbine of the gas turbine engine and expansion is continued in the turbine back down to near atmospheric pressure at point M, which represents exhaust from the gas turbine engine.

(v) The sloping line B to A should be particularly noted, since in effect this represents the process of scavenging the spent combustion gases from the cylinder and the "induction" of the new charge of turbocharging air for compression in the next cycle, i.e. line BA indicates that "scavenging" and "induction" in the diesel engine must take place as the pistons move upwards from bottom dead centre during a first section of their compression strokes.

Further features of the compound engine of FIG. 1 will now be explained with reference to FIG. 2.

Firstly, the turbocharging air in duct 108 is delivered to the cylinders of the diesel engine 100 at a pressure $P_A$ which is higher than the pressure $P_B$ at which the combustion gases from the cylinders are exhausted to the turbine 134 through duct 122. As mentioned previously, this pressure drop across the diesel engine 100 helps promote adequate circulation of the turbocharging air through the cylinders of the diesel and may be ensured by incorporation of scavenge pump 114 in air duct 108. A further advantage is that because $P_A$ is not any less than $P_B$, explosive decompression does not occur when the inlet valves open. Previous practice of making $P_A$ less than $P_B$ has led to such decompression, resulting in unwanted mixing of the spent combustion gases with the new incoming air charge.

Secondly, the compression ratio $R_A$ of the diesel engine 100 is substantially less than its expansion ratio $R_B$, $R_A$ being approximately half the value of $R_B$. In fact the ideal theoretical relationship would appear to be $R_A = 0.5.R_B + 0.1$.

Thirdly, the fact that overall the complete indicator diagram in FIG. 2 is divided by the sloping line A-B, indicates good matching between the compression and expansion characteristics of the diesel engine 100 and the gas turbine 102 in that though the lower part of the diagram J-A-B-M is a typical gas turbine engine indicator diagram, the upper part A-G-K-L-B-A for the diesel engine breaks with convention in not having compression and expansion ratios approximately equal, i.e. its cycle has been altered to make it a better match for the gas turbine engine.

Figure 3:
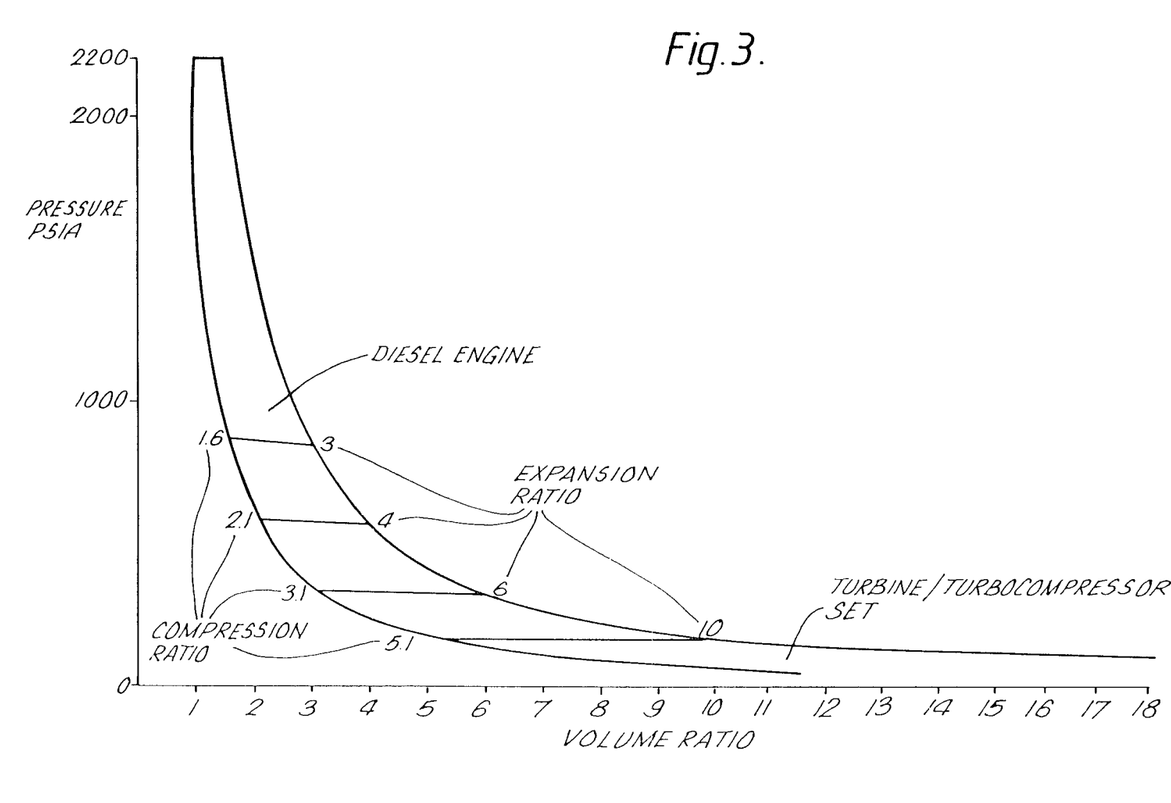
FIG. 3 is a composite indicator diagram illustrative of possible relationships between the gas turbine engine and the diesel engine of FIG. 1, assuming a 2-stroke operating cycle for the diesel engine.

An advantage of this almost horizontal division of the complete indicator diagram by the sloping line A-B is the design flexibility which it gives regarding the size relationship between the diesel engine and the gas turbine engine. Referring to FIG. 3, it will be seen that the sloping line A-B can be drawn at any level of turbocharging pressure without effecting either the theoretical area of the indicator diagram or the peak cylinder pressure, the compression and expansion ratios of the diesel engine bearing the same proportionate relationship to each other no matter what turbocharging pressure is adopted. Hence, as the line A-B moves upwards on the diagram, the size of diesel engine required to handle any given air flow through it is reduced, because the compression and expansion ratios of the diesel engine are reduced. It should be noted that power output from the diesel engine is a function of the pressure ratio of the turbocompressor—doubling the pressure ratio increases the power output by approximately two-thirds as much again—because the power produced in each cylinder depends mainly upon the mass of air contained in the cylinder clearance volume at top dead centre. Looking at FIG. 2, the compression ratio $R_A$ is defined as the volume V of the cylinder swept by the piston plus the unswept or clearance volume v of the cylinder, divided by the clearance volume, i.e. $R_A = (v+V)/V$, therefore $v = V/(R_A - 1)$, hence as the compression ratio is reduced to low values, the cylinder clearance volume becomes large. This relationship can be used advantageously by low compression ratio designs in accordance with our invention because use of a high pressure ratio turbocompressor enables the pressure and temperature of the air retained in the cylinder at the top of the compression stroke to be at normal diesel values, even though large air mass flows are being processed and high powers produced. Alternatively, even higher powers are obtainable if use of advanced heat resistant materials in the pistons and cylinder head, such as superalloys and high-strength ceramics, allows increases in peak cylinder pressure and temperature. In these ways, more of the compression and expansion is carried but in the gas turbine engine and correspondingly less in the diesel engine.

FIG. 3 gives some indication of likely practicable overall ranges for compression and expansion ratios of the 2-stroke diesel of FIG. 1. Overall, the value of the expansion ratio is unlikely to be outside the range 3 to 12 inclusive, and for operation at sea level and normal land altitudes a preferred range for expansion ratio would be 3 to 8 inclusive. At high altitudes (say, 20,000 to 40,000 feet, the compound engine being a powerplant in a transport aircraft) a preferred range for expansion ratio would be 6 to 12 inclusive. Although these ranges are preferred as practicable design parameters for the diesel engine and the gas turbine engine with which it is compounded (the pressure ratios of the turbocompressor and turbine being chosen to match the compression ratio and expansion ratio of the diesel engine as mentioned previously), the advantages of giving the diesel engine as low a compression ratio as possible should be borne in mind. It should be noted that the diesel engine could incorporate a variable compression ratio cylinder head. This would be capable of varying the compression ratio by approximately 50%.

Figures 4A, 4B:
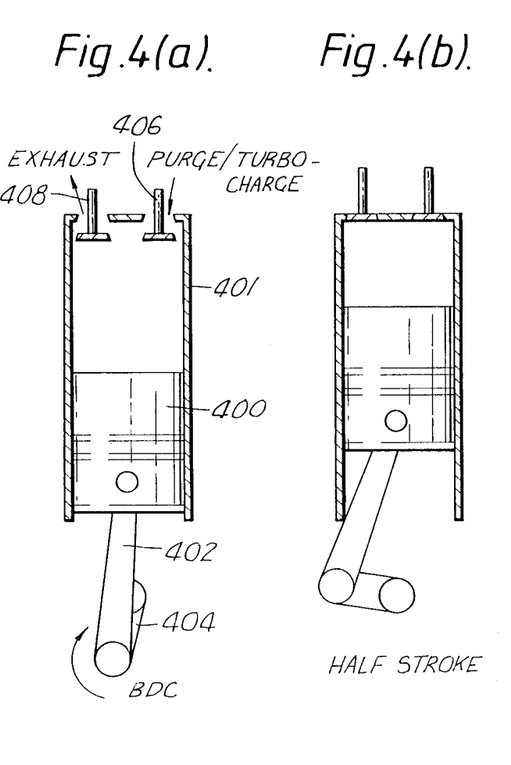
FIGS. 4a to 4d are a diagrammatic representation of the operating sequence of a piston/cylinder combination assuming a 2-stroke operating cycle for the diesel engine of FIG. 1.
Figure 4C:
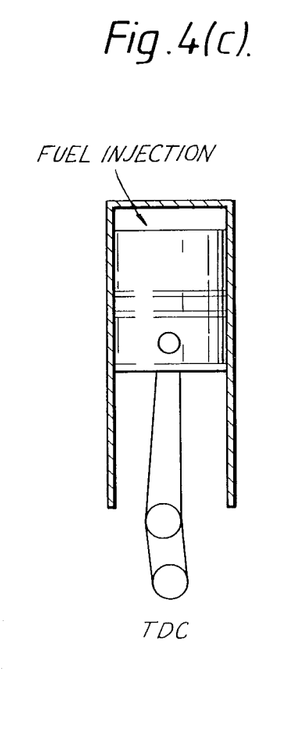
Figure 4D:
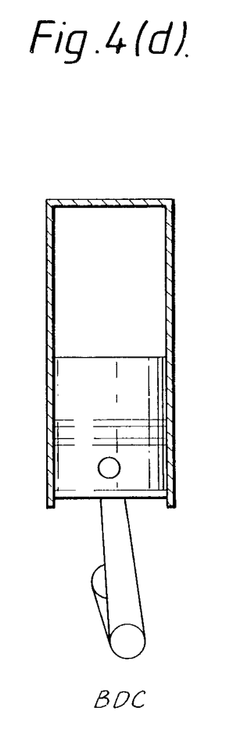

Turning now to FIG. 4, a preferred operating cycle of the 2-stroke diesel of FIG. 1 will be explained in more detail with reference to the four diagrams (a) to (d) which illustrate successive stages in the 2-stroke cycle. FIG. 2 should also be consulted. It should be noted that for convenience of description, the compression stroke is divided into a first (or early) section and a second (or last) section, the first section being subdivided by reference to an initial portion thereof.

FIG. 4(a) shows the piston 400 within cylinder 401 with connecting rod 402 and crank shaft 404 at just after Bottom Dead Centre (BDC), at which position both the inlet valve 406 and the outlet valve 408 are open. The inlet valve 406 admits turbocharging air, which soon pressurises the cylinder 401 up to turbocharging pressure. The position shown in FIG. 4(a) corresponds approximately to point B on FIG. 2. The fact that both inlet and outlet valves are open allows purging of the spent combustion gases from the cylinder 401 due to flow of the turbocharging air through the cylinder, which occurs whilst the piston 400 is moving upwards from BDC during the above-mentioned initial portion of the first or early section of the compressive stroke of the 2-stroke cycle. Of course the inlet and outlet valves are shown only diagrammatically and, for example, provision should preferably be made to positively direct the turbocharging air from the inlet valve 406 down onto the crown of the piston 400 in order to displace the combustion gases towards the exhaust valve by forming a "bubble" of clean air above the piston and thus cause the piston to be more effective in pushing out the exhaust gases through the exhaust valve 408 as the piston moves upwards.

The above-mentioned initial portion of the first section of the upward stroke is ended when the inlet valve 406 closes, preferably a little before half stroke. At this stage active purging by flow-through of turbocharging air ceases. It is preferred that the exhaust valve 408 stays open for a little while longer than the inlet valve 406 to ensure that the cylinder is further scavenged clear of combustion products by the upward motion of the piston 400 pushing them out. It is preferred that the exhaust valve 408 finally closes at a little after half-stroke, as shown in FIG. 4(b) and this marks the end of the first or early section of the upward stroke and the beginning of the second or last section. This position can be identified with point A in FIG. 2. To summarise, therefore, scavenging of the spent combustion gases, including purging with turbocharging air, plus of course induction by turbocharging, are carried out during the first section of the piston's upward or compressive stroke between points B and A on FIG. 2.

Although at present it seems preferable to divide the first or early section of the compression stroke into an initial portion, during which both induction and purging by turbocharging air occur, and a final portion, during which further scavenging occurs whilst turbocharging pressure is maintained in the cylinder by the upward motion of the piston even though the inlet valve has been shut, it may in the light of experimental experience or further theoretical consideration be found more desirable to adjust the valve timing so that the inlet valve closes at the same time as—or even later than—the exhaust valve.

The second or last section of the upward or first stroke of the cycle comprises movement of the piston 400 up the cylinder 401 from the half-stroke position shown in FIG. 4(b) to the Top Dead Centre (TDC) position shown in FIG. 4(c), and is the only section of the cycle actually devoted exclusively to compression of the turbocharging air, though it may be that some slight compression would occur before closure of the exhaust valve 408 due to rapidity of movement of the piston around the half stroke position. Note that in FIGS. 4(c) and 4(d) the inlet and outlet valves are not shown since they remain closed at these times.

Fuel injection from an injector of known type (not shown) occurs as known shortly before TDC, with combustion occurring as the piston passes through TDC. In terms of FIG. 2, TDC may be identified approximately with point G.

The whole of the second or downward stroke of the cycle is used for expansion, from TDC back down to Bottom Dead Centre (BDC) as shown in FIG. 4(d), at which point the cycle recommences.

It will be clear from FIGS. 4(a) to 4(d) why the compression ratio of the diesel engine is much less than the expansion ratio it is of course because the scavenge and induction process occurs during the compressive stroke of the cycle, before actual compression begins.

It will be understood by the person skilled in the art that because the proposed 2-stroke cycle minimises the compression ratio of the piston engine, a smaller volume of turbocharging air is introduced into the cylinder before compression as such commences, i.e. the fresh charge of air at turbocharging pressure only occupies a fraction of the total volume of the cylinder. In the prior art,. however, the compression and expansion ratios are more nearly equal and the cylinder must therefore be completely filled with turbocharging air. Since the incoming air charge is partly used to scavenge the combustion gases from the cylinder, it will be apparent that the proposed cycle can be used to minimise wasteage of turbocharging air in the scavenging process if desired.

It was mentioned in connection with FIG. 1 that the diesel engine 100 was preferably of the 2-stroke type, and the subsequent description in connection with FIGS. 2 to 4 was concerned exclusively with the 2-stroke type of cycle. However, the preference for a 2-stroke cycle is in the interests of minimising the weight of the diesel engine, and for many types of service to which a turbocompounded piston engine could be put, a 4-stroke cycle could be advantageous. Assuming instead, therefore, that the diesel engine 100 of FIG. 1 is of the 4-stroke type, FIGS. 5 and 6 show respectively an operating sequence and an indicator diagram for a piston/cylinder combination of such an engine. FIG. 5 is similar to FIG. 4 in showing a piston 500 moving within a cylinder 501 and connected through a connecting rod 502 with a crankshaft 504. However, inlet and outlet valves are not shown again since their functioning will be apparent from the following description.

Figure 5A:
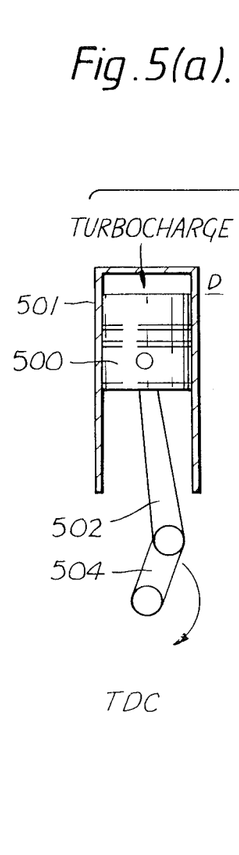
FIGS. 5a to 5f are a diagrammatic representation of a possible operating sequence of a piston/cylinder combination assuming a 4-stroke operating cycle for the diesel engine of FIG. 1.
Figure 5B:
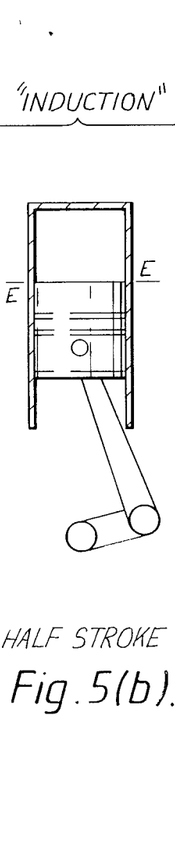
Figure 5C:
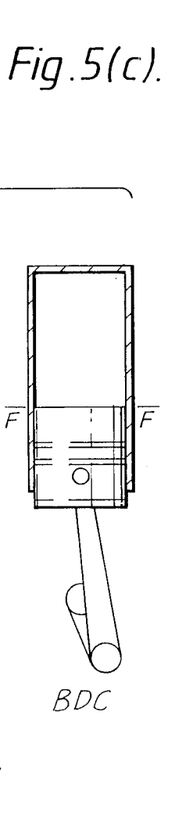
Figure 5F:
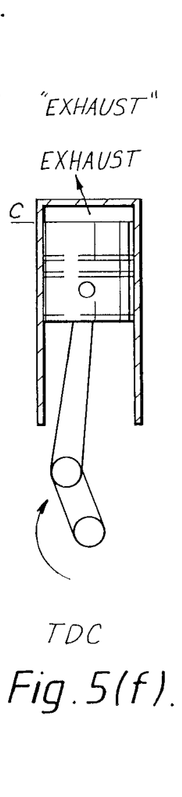
Figure 6:
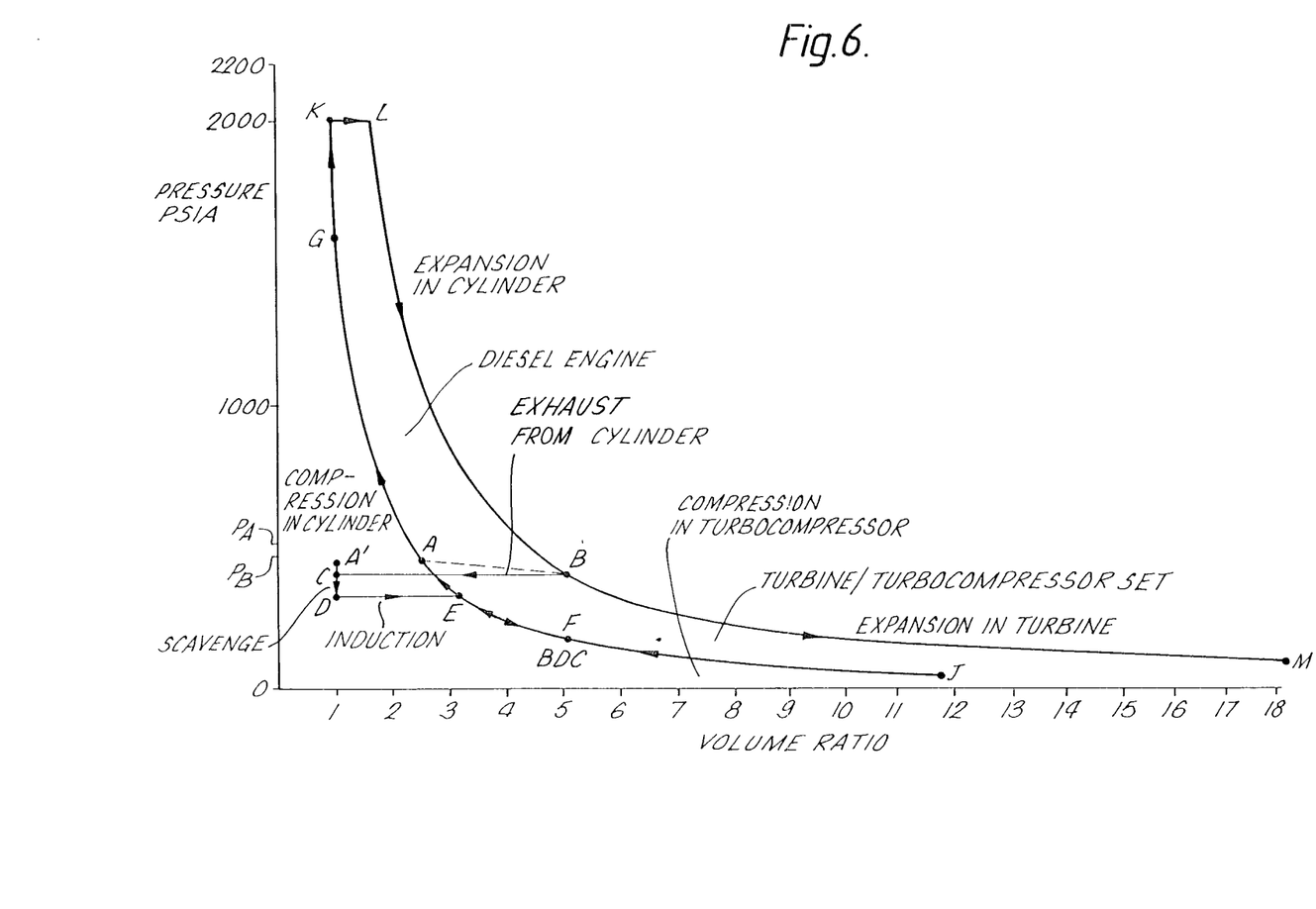
FIG. 6 is an indicator diagram illustrative of the overall operating cycle of the compound engine of FIG. 1, assuming a 4-stroke diesel operating sequence like that of FIG. 5.

FIG. 5(a) shows the piston 600 at a position just after TDC at the start of the first downward stroke of the 4-stroke cycle. This first downward stroke can be referred to as the induction stroke for convenience and the positions of the piston at three points in it are shown in FIGS. 5(a) to 5(c). At the position shown in FIG. 5(a) the inlet valve (not shown) is already open and the exhaust valve (not shown) is closing, the exhaust valve then remaining closed until the beginning of the second upward stroke, known as the exhaust stroke, whereupon it remains open for the duration of the exhaust stroke, whose end position just before TDC is shown in FIG. 5(f). The inlet valve remains open during a first section of the induction stroke whilst the piston 500 travels downwards between position D, shown in FIG. 5(a), and the position E (just before half stroke) shown in FIG. 5(b). It will thus be apparent that turbocharging of the cylinder 501 through the inlet valve occurs between positions D and E.

In order to limit peak cylinder pressures during the compression stroke, and subsequent combustion, to practical values, it is arranged that the inlet valve closes when the piston reaches the position E, or shortly thereafter, and it remains closed until the end of the exhaust stroke. Consequently, the second and final section of the induction stroke is in fact devoted merely to expansion of the turbocharging air within the cylinder 501 as the piston travels downwards from position E to BDC, i.e. approximately to the position F shown in FIG. 5(c), which is a little before BDC. Induction, therefore, actually occurs only during the first section of the induction stroke.

Figure 5D:
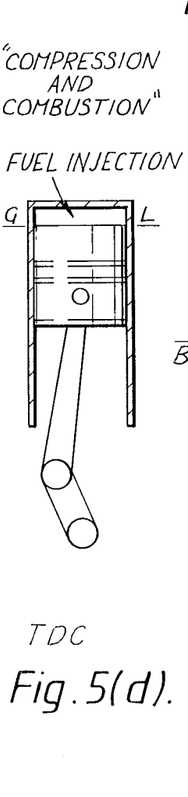
Figure 5E:
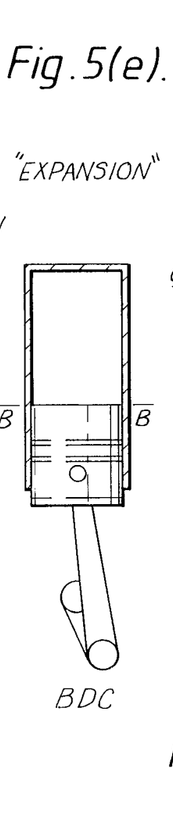

After expansion of the air charge in the cylinder 501 from E to F, the piston 500 commences the first upward stroke of the 4-stroke cycle, known as the compression stroke, moving upwards from BDC to TDC which are approximated by the piston positions F and G shown with reference to FIGS. 5(c) and 5(d). For a first section of this compression stroke, until a position shortly after half-stroke, the piston merely recompresses the air charge back up to the turbocharging pressure. From this intermediate position until the piston reaches TDC, the air charge is compressed to higher pressure than the turbocharging pressure. At about position G, just before TDC, fuel is injected and combustion occurs at TDC and shortly afterwards at the start of the second downward stroke, known as the expansion stroke. During this expansion part of the cycle, the valves remain closed as the piston travels downwards to BDC once more, this movement being indicated with reference to FIGS. 5(d) and 5(e) as being between positions L and B, which are respectively just after TDC and just before BDC. The distinction between positions G and L is connected with the combustion process as explained below with reference to FIG. 6. Finally, as already mentioned, the exhaust valve is opened again at BDC, or just before it at position B, and the upward stroke of the cycle is commenced, during which the spent combustion gases are exhausted to the turbine 134 of the gas turbine engine 102 (FIG. 1).

In order to aid scavenging of the spent combustion gases from the clearance volume of the cylinder 501 and thereby ensure a very clean charge of air in the cylinder for most efficient combustion, it is arranged that during an initial portion of the first section of the induction part of the cycle, between TDC and a position after TDC such as D shown in connection with FIG. 5(a), the inlet and exhaust valves are both open at the same time, allowing the turbocharging air to flow through the clearance volume, so effectively purging out the combustion products. Preferably, the inlet valve is opened just before TDC (position C, FIG. 5(f)) during a final portion of the exhaust stroke, giving a valve timing overlap between the inlet and outlet valves throughout the period between piston positions C and D.

Referring now to FIG. 6, the above operational sequence of FIG. 5 will be referred to an idealised indicator diagram of the complete cycle of the compound engine. The letters used in FIG. 5 referring to the positions of the cylinder are also utilised on the indicator diagram.

As described in relation to FIG. 2, compression of air occurs in the turbocompressor of the gas turbine engine, and in the scavenge pump (if present), from point J on the indicator diagram up to turbocharging pressure $P_A$ at point A. Pressure $P_B$ at point B is the pressure at which the combustion gases from the 4-stroke diesel engine are exhausted to the turbine for further expansion on the curve B-M down to atmospheric pressure, expansion in the cylinder having already occurred as in FIG. 5(e) from point L at peak cylinder pressure near TDC to point B at or near BDC. It should be noted that, as in FIG. 2, the turbocharging air is delivered to the diesel engine at a pressure $P_A$ which is higher than the pressure $P_B$ at which the combustion gases are exhausted to the turbine.

The exhaust valve is of course opened at point B and the line B-C represents the exhaust stroke shown in FIG. 5(f), the point C being TDC. As explained previously, it is at about this point that the inlet valve is opened, the exhaust valve also remaining open, to allow a purging flow of turbocharging air through the clearance volume of the cylinder and thereby assist scavenging of the combustion products. Point A' represents a possible momentary increase in pressure within the cylinder at about TDC when the inlet valve is opened to admit turbocharging air at pressure $P_A$. There is then a slight decrease in pressure as the scavenging process occurs between points C and D, D being after TDC at the beginning of the induction stroke shown in FIGS. 5(a) to 5(c). D is the point at which the exhaust valve finally closes, thus ending the initial scavenging portion of the first section of the induction stroke. Line D-E represents the rest of the first section of the induction stroke up to approximately half-stroke, during which the rapidly increasing cylinder volume is turbocharged. Induction as such ceases at E with closure of the inlet valve and thereafter the rest of the induction stroke is devoted to expansion of the charge of air, this being indicated by the curve E-F, F being BDC at the end of the induction stroke. As mentioned previously, early closing of the inlet valve at E acts to limit peak cylinder pressures to acceptable values.

It should be noted that the part of the indicator diagram just discussed, namely that defined by the points B-C-D-E-F, has been drawn in a schematic form to aid explanation and in an actual engine is likely to differ from that shown. In particular, lines BC, CD and DE would be unlikely to be perfectly horizontal and vertical as shown, and lines BC and DE could be closer together.

After the end of the induction stroke at F, the air charge is recompressed back up to turbocharging pressure $P_A$ along curve F-E-A, point A being just after half stroke in the compression stroke of the cycle (FIG. 5(d)). Thereafter the air charge is further compressed up to TDC at G, fuel being injected just before this point and combustion then occurring first at approximately constant volume (G-K) and then at constant pressure (K-L). Point L, just after TDC, marks the beginning of the expansion stroke back down to exhaust pressure $P_B$ at point B and the beginning of another cycle.

It should be noted that the above-described technique of closing the inlet valve relatively early in the induction stroke in order to expand the induced air charge during the rest of the induction stroke, and thereby limit subsequent peak cylinder pressures, is known in the field of turbocharged reciprocating piston engines as the "more complete expansion cycle". However, it is thought to be novel to use such a cycle in conjunction with a compression/expansion cycle of the gas turbine engine type as shown in FIG. 6 by the points J-A-B-M.

A further point to note concerning FIG. 6 is that by the nature of the "more complete expansion" type of cycle used, the compression ratio of the 4-stroke diesel engine, though effectively, at point E, substantially less than the expansion ratio at point B, does not conform to the rule for the 2-stroke diesel of being approximately half the expansion ratio.

Thus far, the descriptions of the specific embodiments of the present invention have referred to diesel engines of the reciprocating variety having either 2-stroke or 4-stroke cycles. Nevertheless, the invention embraces other types of turbocompounded positive displacement engines, such as those having rotors instead of reciprocating pistons. Such rotary combustion engines in the positive displacement class of engines can perform a "2-stroke" type of cycle.

Figure 7:
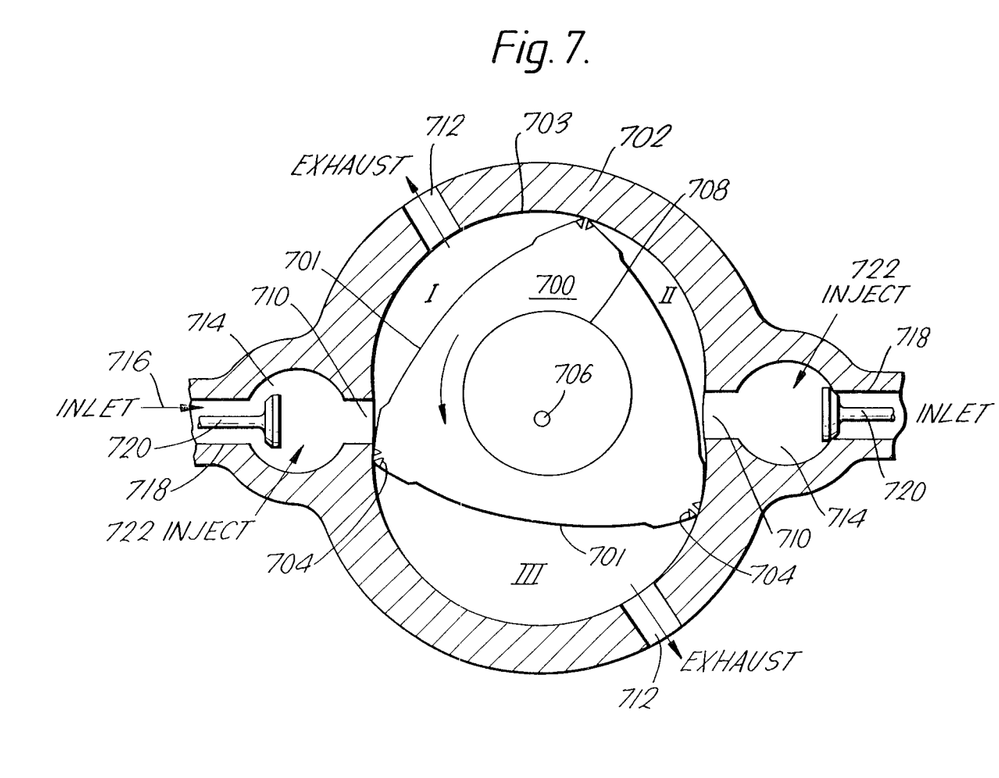
FIG. 7 is a diagrammatic representation of a rotary piston or Wankel-type engine capable of performing an operating cycle like that shown in FIG. 2.

An example of the rotary type of positive displacement engine is shown in FIG. 7. Here, a Wankel type of mechanical arrangement is adapted to perform the proposed "2-stroke" compression-ignition cycle. A triangular rotor 700 with convex sides 701 is mounted within a housing 702, the interior surface 703 of which is epitrochoidally shaped to maintain contact with edge seals 704 on the three edge of the rotor as it rotates eccentrically about centre 706. The internal diameter 708 of the rotor 700 is provided with an internal concentric ring gear (not shown) which engages a gear wheel (not shown) which is concentric with the driving shaft (not shown). These mechanical details are readily available from text books, but the arrangement of the inlet and exhaust ports is not.

When the rotor 700 rotates in the direction of the arrow, the seals 704 mounted at its three edges continuously sweep along the wall 703 of the housing 702, forming three enclosed rotating spaces I,II, and III between the convex sides 701 of the rotor and the wall. These three enclosed spaces I,II,III are combustion chambers, like the space above the piston of a reciprocating piston engine, which successively increase and decrease in size during each revolution of the rotor 700. As the seals 704 sweep over the wall surface 703 they repeatedly expose inlet and exhaust ports 710,712 respectively, and the variations in the volumes of the enclosed spaces I,II,III, are used to produce, for the progress of each respective space around the centre 706, compression and expansion parts of a cycle equivalent to a 2-stroke reciprocating engine cycle with an indicator diagram like that of FIG. 2. This is possible because the inlet and exhaust ports are duplicated on opposite sides of the housing 702 so producing a more symmetrical housing than previously known and thus minimising thermal distortion. This arrangement enables each space to perform the compression and expansion "strokes" twice per complete revolution of the rotor.

Describing the engine further, each inlet port 710 is connected with a chamber 714 which acts as a small indirect combustion chamber. Chambers 714 are connected to receive turbocharging air 716 through inlet passages 718, and these passages 718 are provided with inlet valves 720 to control the flow of turbocharging air into the engine.

At appropriate points in the cycle, fuel injectors (not shown) inject fuel 722 into the chambers 714.

The operating cycle with respect to a selected one of the rotating combustion chambers or spaces I,II or III, and its corresponding convex face 701 of the rotor, is as follows.

(i) The compression part or "stroke" of the cycle can be divided into three sections, namely, a last section devoted to compression and fuel injection, and two earlier sections, the first of which comprises merely the exhaustion of combustion products unassisted by purging with turbocharging air, and the second of which comprises "induction" of the turbocharging air; furthermore, an initial portion of this second early section is devoted to the task of scavenging the rotating space free of spent combustion products by purging it with turbocharging air. In more detail:

(a) The first of the two earlier sections of the compression part of the cycle begins with the rotating space being in communication only with one of the exhaust parts 712, this having been uncovered by the leading edge seal 704 of the convex rotor face 701 at or near the end of the expansion "stroke" of the previous cycle—see space III in FIG. 7. As the volume of the rotating space starts to reduce as the compression "stroke" proceeds, spent combustion products are positively expelled from the exhaust port 712.

(b) The end of the first earlier section of the compression "stroke", occurs when the leading edge seal 704 of the rotor face 701 uncovers an inlet port 710, its inlet valve 720 being open to admit turbocharging air. This marks the beginning of the initial portion of the second of the two early sections of the compression "stroke", because the distance between each inlet port 710 and its nearest adjacent exhaust port 712 is such that during the said initial portion, turbocharging air is free to flow through the associated chamber 714 and the rotating space, so purging them of spent combustion products and ensuring a clean charge of air at turbocharging pressure in the rotating space. Space I in FIG. 7 illustrates this initial "scavenging" portion of the second earlier "scavenge and induction" section of the compression "stroke".

(c) To end the initial "scavenging" portion of the second section, to which reference has just been made, the trailing edge seal 704 of the rotor face 701 cuts off the exhaust port 712 from communication with the rotating space. Shortly thereafter the inlet valve 720 is shut, so ending the second "induction" section of the compression part of the cycle.

(d) The last section of the compression part of the cycle starts when the inlet valve 720 shuts, the pressure in the chamber 714 and in the rotating space increasing above the turbocharging pressure as the volume reduces further. Just before the volume of the rotating space reaches a minimum, i.e. just before the middle of the rotor face 701 is in line with the inlet port 710, fuel 722 is injected into the chamber 714 and combustion occurs when the volume is minimised due to compression ignition on the diesel principle.

(ii) As the above rotor face 701 continues to move past the inlet port 710 the volume of the rotating space starts to increase again, the combustion process giving a turning force to the rotor 700. FIG. 7 illustrates this condition with respect to rotating space II. This is the beginning of the expansion part of the cycle, at the end of which the volume of the rotating space reaches a maximum, and the cycle repeats.

Some additional observations concerning the above are necessary.

Firstly, note that the exhaust phase of the cycle comprises the first section of the compression "stroke" and at least part of the second section, and can also overlap the end of the expansion "stroke", if this is found to be desirable.

Secondly, although at present it seems preferable to divide the second of the two early sections of the compression stroke (i.e. the "induction" section) into an initial portion, during which both induction and purging by turbocharging occur, it may in the light of experimental experience or further theoretical consideration be found more desirable to adjust the inlet valve timing so that the inlet valve 720 closes just as or even before the trailing edge seal 704 cuts off the exhaust port 712 from the rotating space.

Thirdly, it should be understood that, as for the other embodiments of the invention described previously, the rotary positive displacement engine cycle just described is assumed to incorporate the concept of optimum matching to the cycle of the turbine/turbocompressor set with which it is compounded, the turbocharging air 716 being delivered to the chamber 714 at a pressure higher than the pressure at which the combustion gases are exhausted to the turbine, the compression ratio of the rotary positive displacement engine being substantially less than its expansion ratio. As for the 2-stroke reciprocating diesel embodiment of the invention, it is preferable that the compression ratio is approximately half the expansion ratio, so that an indicator diagram for the compound engine would conform substantially to that shown in FIG. 2.

Fourthly, although the rotary positive displacement engine embodiment of the invention described above was of the Wankel 2-stroke diesel type, other types of rotary positive displacement engines could be utilised in accordance with the invention.

Fifthly, the reduced pressure difference between the rotating combustion chamber and turbocharging pressures, compared with those of a normal diesel, may relieve the sealing problems sometimes experienced in the rotary piston type of engine.

A more general observation is that although the above-described embodiments of the invention have assumed that the turbine/turbocompressor set of the compound engine is capable of operation independently of the positive displacement engine as a gas turbine engine, lower power installations, e.g. for large automobiles or trucks, would not require the extra power from the gas turbine engine, and the turbine/turbocompressor set could be merely a turbocharger installation without its own combustion chamber. However, the indicator diagram for the turbocompounded positive displacement engine would still be of the shape shown in FIG. 2 or FIG. 6. Note also that the connection between the turbocharger output shaft and the positive displacement engine output shaft would probably be electrical rather than mechanical.

What is claimed:

1. A prime mover comprising a positive displacement engine compounded with a gas turbine engine, the prime mover having power outputs comprising a low speed output from said positive displacement engine and a high speed output from said gas turbine engine, said gas turbine engine having combustion chamber means, a turbocompressor and a turbine, said prime mover having turbocharging air delivery means for delivering turbocharging air from the said turbocompressor to said positive displacement engine and combustion gas exhaust means for exhausting combustion gases from the positive displacement engine to the turbine for driving the turbocompressor, said positive displacement engine having a compression ratio which is substantially less than its expansion ratio, whereby the turbocharging air is delivered to the positive displacement engine at a first high pressure and the combustion gases are exhausted to the turbine at a second pressure lower than said first high pressure, said compression ratio being approximately half the expansion ratio of said positive displacement engine.

2. A prime mover according to claim 1, in which the positive displacement engine is adapted to perform an operating cycle of the 4-stroke type known as a more complete expansion cycle.

3. A prime mover according to claim 1, in which the positive displacement engine is adapted to operate with a compression ratio which is half its expansion ratio plus 0.1.

4. A prime mover according to claim 1 in which the turbocharging air delivery means includes scavenge pump means for ensuring that the first pressure is substantially higher than the second pressure.

5. A prime mover according to claim 1 in which the gas turbine engine has combustion chamber means in flow series between the turbocompressor and the turbine, and further having a free power turbine in flow series after the turbine, the combustion gas exhaust means being connected between the positive displacement engine and the combustion chamber means, whereby the combustion gases from the positive displacement engine are exhausted to the turbine through the combustion chamber means.

6. A prime mover according to claim 5 in which the combustion gas exhaust means includes a combustion gas distribution duct which surrounds the combustion chamber means and is adapted to distribute the combustion gases substantially evenly around the combustion chamber means.

7. A prime mover according to claim 5 in which the turbocharging air delivery means includes valve means for selectively preventing delivery of turbocharging air to the positive displacement engine, whereby the gas turbine engine can be operated whilst the positive displacement engine is shut down.

8. A prime mover according to claim 1 in which the turbocharging air delivery means is adapted to deliver a portion of the turbocharging air to a cooling system of the positive displacement engine in order to obtain semi-adiabatic operation thereof, the prime mover being further provided with air exhaust means for exhausting said portion of the turbocharging air to the turbine after use in the cooling system.

9. A prime mover according to claim 5 in which the turbocharging air delivery means is adapted to deliver a portion of the turbocharging air to cool the positive displacement engine in order to obtain semi-adiabatic operation thereof, the prime mover being further provided with air exhaust means connected between the positive displacement engine and the combustion chamber means whereby said portion of the turbocharging air is exhausted to the turbine through the combustion chamber means after use to cool the positive displacement engine.

10. A prime mover according to claim 9 in which the air exhaust means includes an air distribution duct which surrounds the combustion chamber means and is adapted to distribute the air substantially evenly around the combustion chamber means.

* * * * *

UNITED STATES PATENT AND TRADEMARK OFFICE
CERTIFICATE OF CORRECTION

PATENT NO. : 4,873,825

DATED : October 17, 1989

INVENTOR(S) : John A. J. Rees

It is certified that error appears in the above-identified patent and that said Letters Patent is hereby corrected as shown below:

On the first page of the patent, under item [19], "Jenes" should be --Rees--

On the first page of the patent, please delete the present inventor's name and insert the following:

--John A. J. Rees--

Signed and Sealed this

Fifth Day of February, 1991

Attest:

HARRY F. MANBECK, JR.

Attesting Officer     Commissioner of Patents and Trademarks